United States Patent [19]

Prange et al.

[11] 3,822,003

[45] July 2, 1974

[54] AUTOMATIC BRAKE ADJUSTMENT MECHANISM

[75] Inventors: James M. Prange, Dearborn Heights; William J. Williams, Lake Orien, both of Mich.

[73] Assignee: Rockwell International Corporation, Pittsburgh, Pa.

[22] Filed: Feb. 22, 1973

[21] Appl. No.: 334,854

[52] U.S. Cl. ........ 188/79.5 GE, 74/578, 188/196 BA
[51] Int. Cl. ............................................. F16d 65/56
[58] Field of Search ............ 74/575, 578; 188/71.8, 188/71.9, 79.5 GE, 79.5 GT, 79.5 P, 196 B, 188/196 BA, 196 D

[56] References Cited
UNITED STATES PATENTS 3,068,964 12/1962 Williams et al. ............. 188/79.5 GE
3,227,247 1/1966 Sherretts et al. ............. 188/79.5 GE Primary Examiner—Duane A. Reger

[57] ABSTRACT

A wedge actuated brake assembly including a self-adjusting brake actuating mechanism. A ratchet member on the mechanism cooperates with a pawl mounted in a bore in the brake actuator housing to control mechanism movement. The pawl is part of an assembly that extends into the actuator housing and includes the pawl member itself in toothed engagement with the ratchet member, spring means urging the pawl into engagement with the ratchet member and closure means sealing the housing bore in which the pawl assembly is located and acting as a reaction member for the spring. The pawl, spring means and closure means permanently are joined together as a unitary subassembly.

4 Claims, 4 Drawing Figures

AUTOMATIC BRAKE ADJUSTMENT MECHANISM

BACKGROUND OF THE INVENTION

In recent years wedge actuated brake mechanisms have been widely adopted for heavy duty vehicles such as highway and off highway heavy duty trucks and other vehicles. Examples of such brake mechanisms are illustrated in U.S. Pat. No. 3,037,548 issued June 5, 1962 to F. T. Cox et al for "Wedge Actuated Brake Assembly" and U.S. Pat. No. 3,599,762 issued Aug. 17, 1971 to Frank T. Cox et al for "Wedge Actuated Three-Shoe Brake." Commercial versions of brakes such as these range in size from 15 inches to 42 inches in diameter.

In wedge actuated brakes such as these the brake shoes are forced outwardly into engagement with the associated brake drum by forcing a wedge between the adjacent ends of a pair of aligned plungers which are disposed between opposed ends of adjacent brake shoes. The wedge is free on its support to float slightly, the actuated lateral position of the wedge being determined by the resultant of the reaction forces exerted upon it by the opposed plungers.

These brakes are subjected to tremendous loads in operation due to the size of the vehicles and of the loads carried by them. This results in relatively rapid wear of the lining of the brake shoes of such brakes. As a result it is customary to equip such brakes with a mechanism which will automatically adjust the brake actuator to accommodate for wear of the brake linings and to maintain the travel of the brake shoes and of the associated plungers between their disengaged and engaged positions substantially constant throughout the normal life of the linings. An example of such an adjustment mechanism is illustrated in U.S. Pat. No. 3,068,964 issued Dec. 18, 1962 to W. J. Williams et al for "Automatic Brake Adjustment."

In such adjusting mechanisms one of the wedge actuated plungers for each brake shoe is a composite plunger assembly of adjustable axial length. The length of the assembly is increased automatically to accommodate for decrease in shoe lining thickness as the lining wears. This increase in length results in part from the interaction between a ratchet member that comprises part of the plunger assembly and a spring biased pawl that extends into toothed engagement with the ratchet member. As may be seen from said U.S. Pat. No. 3,068,964, such a pawl conventionally extends through a bore formed in the brake actuator housing and cooperates with an expansion spring also located in the bore and an outer plug that functions both as a reaction member for the spring and to close the housing bore against the entry of dirt and contaminants.

Any time it is necessary to disassemble the slack adjustment mechanism of U.S. Pat. No. 3,068,964 as for a maintenance inspection, it is necessary to remove the pawl from its toothed engagement with the ratchet member to free the latter for manual removal from the actuator housing. It is not unusual for such a disassembly to be necessary many times during brake actuator life. It has been found through actual experience during commercial use of such brake equipment that disassembly of the slack adjustment mechanism entails a substantial risk of loss of parts because of the removal of the pawl and associated parts. These parts are quite small and easy to misplace. In addition, when the outer plug which normally is threaded into the actuator housing is removed, the spring force often propels the plug out of the grasp of the mechanic and it may be lost. In addition, removal of the pawl itself from the actuator housing often is extremely difficult as the nature of this part requires that it be received in the bore by a close fit. It has thus been found that brake actuator parts sometimes are damaged by mechanics attempting to free the pawl member.

It is an object of this invention to provide a wedge type brake having an actuator of the type described including an automatic adjusting mechanism that quickly and easily may be disassembled for inspection or the performance of necessary maintenance. In addition, this invention provides for the simple removal of actuating mechanism pawl with the possibility of losing, misplacing or damaging parts being minimized.

SUMMARY OF THE INVENTION

The present invention provides a wedge actuated brake assembly having a movable brake shoe adapted to engage a surrounding brake drum and a self-adjusting brake actuating mechanism. This actuating mechanism includes a housing having a first opening therein that receives a plunger assembly that is guided in the first opening for rectilinear movement and is adapted when urged out of the first opening to force the brake shoe towards the drum. The brake assembly is automatically axially expansible to accommodate wear of the lining of the brake shoe. The plunger assembly includes a ratchet member having teeth formed thereon and being slidably and rotatably received in the first opening. A pawl assembly extends into a second opening formed in the housing and communicating with the first opening. The pawl assembly includes a pawl member in toothed engagement with the ratchet member, a spring urging the pawl member into engagement with the ratchet member and a closure member acting as a reaction element for the spring and sealing the end of the second opening that is remote from the first opening. The pawl, spring and closure member are joined together such that they can be removed as a unit from the second opening, thereby minimizing the chance of loss of these elements during disassembly of the actuating mechanism and damage to brake assembly parts due to the difficulty of extracting the pawl from the second opening.

DESCRIPTION OF THE INVENTION

Figure 1:
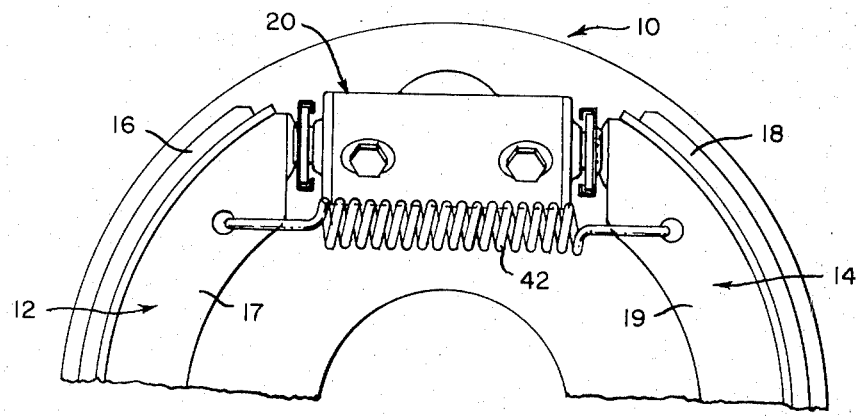
FIG. 1 is a fragmentary view of a brake assembly embodying the present invention.

With reference to FIG. 1 there is shown a brake shoe and actuator assembly 10 such as may be normally employed in automotive drum type brakes. In this instance the assembly consists of opposite brake shoes 12 and 14 having brake linings 16 and 18 respectively. The webs 17 and 19 of the brake shoes may be connected at one or both ends by an actuator 20, or the other ends of the brake shoes (not shown) may be pivotally anchored as is common practice.

The actuator 20 is provided with adjusting mechanisms 22 and 23 to compensate for brake lining wear. When only one actuator is provided and the brake shoes are anchored at the other end, (as in FIG. 15 of said U.S. Pat. No. 3,037,584), the actuator is provided with two adjusting mechanisms 22 and 23, one each between actuator 20 and brake shoe 12 and between actuator 20 and brake shoe 14, as illustrated. However, when the brake mechanism 10 is equipped with actuators at both ends of the brake shoes (as in FIG. 1 of U.S. Pat. No. 3,037,584) only one adjusting mechanism will be provided at each actuator in diagonal opposite position to adjust both brake shoes 12 and 14 independently of each other. In any case, the actuators 20 and adjusting mechanisms 22 and 23 will be identical and it will therefore suffice to describe only one of them in detail.

Figure 2:
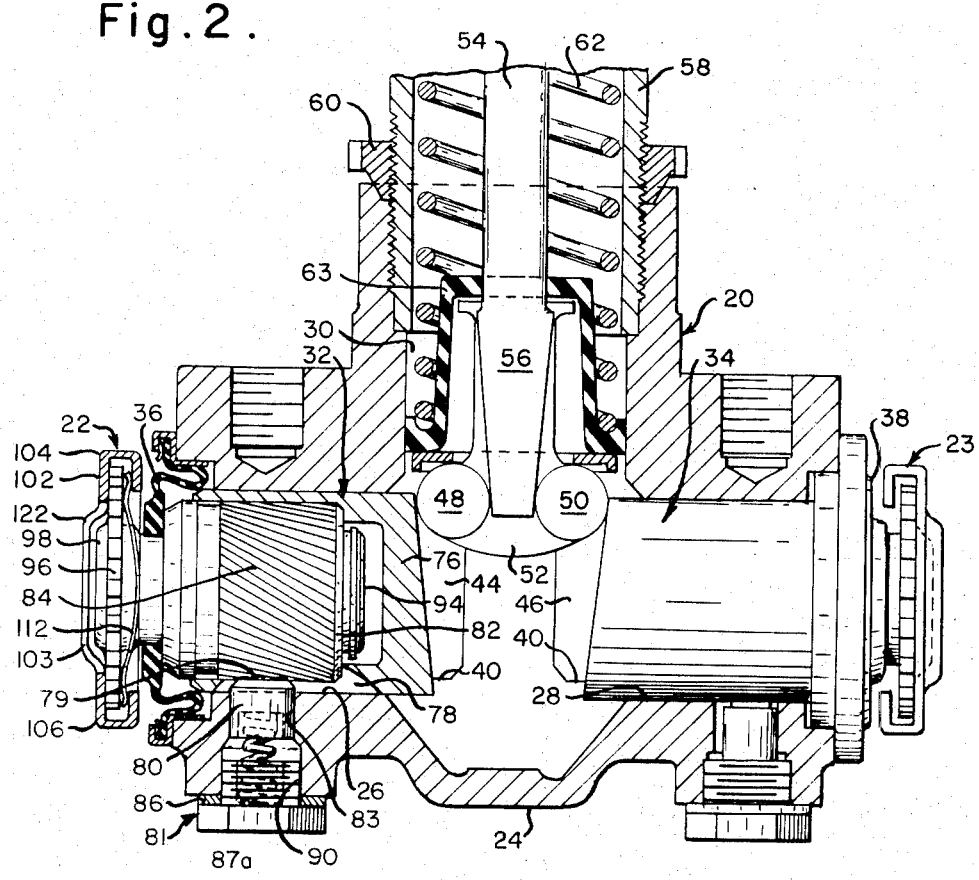
FIG. 2 is a sectional view through the brake actuator of the assembly of FIG. 1.

With reference to FIG. 2 the actuator 20 comprises a housing 24 which may be integral with or attached to a brake spider or support (not shown) as disclosed in U.S. Pat. No. 3,037,584. Housing 24 is provided with aligned bores 26 and 28 which are intersected at the center of the housing by a stepped bore 30 the axis of which is normal to the common axis of bores 26 and 28. Bores 26 and 28 receive reciprocating plunger assemblies 32 and 34, respectively, extending outwardly thereof in abutting engagement with the brake shoes 12 and 14 respectively as is illustrated in FIG. 1. The outer end of the bores 26, 28 are sealed by diaphragm type seals 36 and 38 securely attached to the housing 24 and connected in sealing relation to the shank of the studs of the plunger assemblies 32, 34 respectively to prevent the entrance of foreign matter into the housing 24 and the plunger assemblies 32 and 34 while retaining lubricant therein.

When the plunger assemblies 32, 34 are retracted, their inner ends abut against a central raised boss portion 40 within the housing 24. The brake shoes 12 and 14 are normally retracted by the return spring 42 to press the plunger assemblies 32 and 34 inwardly against the boss 40.

The inner ends of adjusting nuts of the plunger assemblies 32, 34 are slotted transversely as at 44 and 46 respectively, the slots being inclined inwardly in a converging direction towards each other. The plunger slots 44, 46 are adapted to receive rollers 48 and 50 respectively which are rotatably secured within a bifurcated cage 52 attached to a pushrod 54. The lower end of the pushrod 54 is provided with a wedge extension 56 which extends into the roller cage 52 and between the rollers 48 and 50. The opposite faces of the wedge 56 are inclined at an angle corresponding to the angle of inclination of the plunger slots 44 and 46. This wedge and roller actuating mechanism is disclosed in detail in the aforementioned U.S. Pat. No. 3,037,584.

The pushrod 54 and part of the wedge 56 and roller cage 52 extend outwardly through bore 30 and into a tubular adapter housing 58 threaded into the actuator housing 24 and secured thereto by a large locknut 60. The adapter housing 58 may be attached to a hydraulic or air pressure motor or mechanical lever linkage (not shown) as disclosed in U.S. Pat. NO. 3,037,584 to reciprocate pushrod 54 when actuated. A coil spring 62 retained at one end in fixed position relative to the outer end of the pushrod 54 by a retainer disc (not shown) and seating at its other end against the radial flange of a rubber boot 63 which rests upon a retainer disc 64 seated upon shoulders (not shown) in the cage 52. Spring 62 normally tends to urge the pushrod 54 outwardly retracting the wedge and roller assembly sufficiently to allow the plungers 32 and 34 to abut against the anchor boss 40. Boot 63 provides a seal between the pushrod 54 and the bore 30 to prevent egress of lubricant and ingress of contaminants.

When the pushrod 54 is forcibly displaced inwardly of housing 24 by either of the aforementioned operator means (not shown), the wedge and roller assembly 48, 50, 56 is displaced inwardly causing the rollers 48, 50 to roll along the inclined surfaces of the slots 44 and 46 thereby forcing plunger assemblies 32 and 34 oppositely outwardly of housing 24 to move the associated brake shoes 12 and 14 apart against the force of the return spring 42 to contact an associated brake drum (not shown).

The plunger assemblies 32 and 34 are each adjustable to vary their effective lengths and are of identical construction.

By way of illustration, the adjustable plunger 32 embodies an adjusting mechanism 32 of a type similar to that disclosed in detail in U.S. Pat. No. 3,068,964 and it includes an axially slidable adjusting plunger member 76 held against rotation by a pawl member 80 of the unitary pawl assembly 81 which extends into an axially elongated radial slot 78 in member 76. (The construction of pawl assembly 81 will be explained in detail below.) Member 76 receives an inner adjusting nut 82 which is rotatable relative to member 76 under certain conditions as will be explained. Adjusting nut 82 is provided with spiral teeth 84 on its outer surface which are engaged by complementary spiral teeth 79 on the end of pawl 80.

Pawl assembly 81 especially is designed to cooperate with and position adjusting nut 82, which functions as a ratchet member, as well as to allow easy removal of pawl member 80 when disassembly of actuator 20 is desired. Assembly 81 extends in part into bore 83 which extends through housing 24 and communicates with and is at a right angle to bore 26. Assembly 81 includes three elements: the pawl 81, spring 85, and plug 87.

Figure 3:
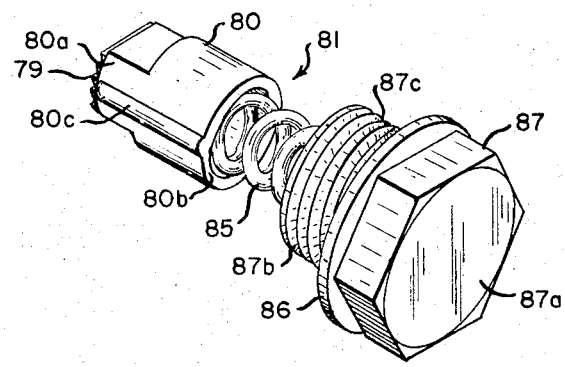
FIG. 3 is an isometric view of the self-adjusting mechanism pawl subassembly of the brake assembly of FIGS. 1 and 2.
Figure 4:
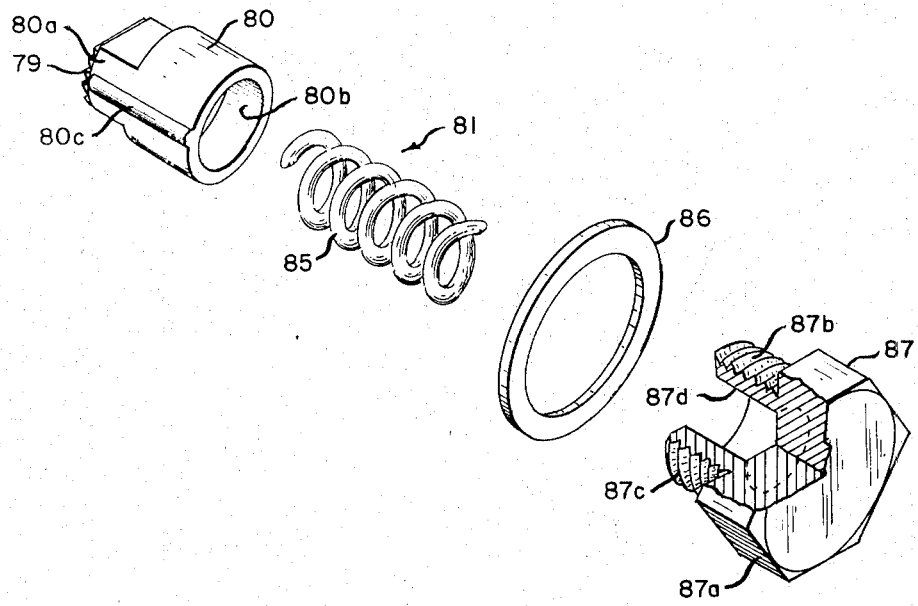
FIG. 4 is an exploded view of the parts of the subassembly of FIG. 3.

As best may be seen from FIGS. 3 and 4, pawl 80 has a general cylindrical shape with the front portion 80a thereof having flat sides 80a facilitating the reception of pawl 80 in slot 78 in a manner preventing rotation of the pawl. A bore 80b is formed in the rear end of the pawl. A raised rib 80c runs along the length of pawl 80 and is received in a complementary slot formed in bore 83 to orient and locate assembly 81 in bore 83 and insure proper toothed engagement between pawl teeth 79 and adjusting nut teeth 84.

Plug 87 resembles generally a cap screw in that it includes a head portion 87a and a shank 87b having external threads 87c. The end of shank 87b remote from head 87a has a bore 87d formed therein. A seal 86 has an internal diameter dimensioned so that the seal will fit snugly over shank 87b.

Coil spring 85 has an outside diameter of a size allowing one end of this spring to be received with an interference fit into bore 80b of pawl 80 and the other end of the spring to be received with an interference fit into plug bore 87d. With the assembly parts fitted together in this manner, assembly 81 comprises a unitary element as illustrated in FIG. 3 and is so assembled in bore 88. The outer portion 90 of bore 88 is formed with internal threads that engage plug threads 87c. As the plug 87 is threaded into bore 88 and pawl 80 contacts nut 82, spring 85 is compressed and thus exerts a force urging teeth 79 into engagement with teeth 84. Seal 86 is compressed to close the external end of bore 88.

Removal of pawl assembly 81 from bore 88 is a simple and easily accomplished task. Plug head 87a easily is accessible for engagement by a tool to unthread plug 87. Sufficient axial pulling force then may be applied by the mechanic to plug 87 to free the pawl from its toothed engagement with nut 87 and extract the entire assembly 81 as a unit from bore 88. Since the parts of assembly 81 permanently are joined together, the possibility of loss of one or more of these parts and especially plug 87 which otherwise may be thrown by the force of spring 87 at the time of disengagement of the plug, is minimized.

Threaded into the adjusting nut 82 is an adjusting stud 94 provided with a star wheel 96 by which the stud 94 may be manually rotated in or out of nut 82. The outer end of stud 94 has a central boss portion 98 having a bearing surface against which the end of web 17 of the brake shoe 12 abuts.

Surrounding the star wheel 96 is a generally rectangular clip 102 formed of sheet metal. The web 17 extends through the complementarily shaped aperture 103 of clip 102 into abutment with boss 98 and prevents rotation of clip 102. The ends 104 and 106 of the longer side of the clip 102 are bent into substantially U-shaped forms to extend over and behind the star wheel 96. The spaces between the U-bends and the edge of the star wheel 96 are occupied by a leaf spring 112 extending transversely across the smaller side of the clip 102. The spring is prestressed and bent as shown towards the star wheel 96 against which it resiliently abuts. Thus, the clip 102 and spring 112 normally frictionally retain the star wheel 96 from turning.

Thee center of the clip 102 is pressed outwardly from its generally flat base portion to provide a circular boss 122 which is slotted at 103 longitudinally of the clip. The slot 103 extends into the flat base portion of the clip on both sides of the boss 122 and is adapted to receive the end of the web 17 of brake shoe 12 which extends into the slot and buts against the bearing surface of the boss 98 on the stud 94. Thus, the brake shoe 12 is held against lateral shifting movement in the slot 103 allowing, however, rotational movement of the star wheel 96 upon manual adjustment which can be accomplished by turning the star wheel with a tool inserted between the teeth of the star wheel. The resisting force of the spring 112 is overcome so that the star wheel can be turned. The brake shoe 12 is then moved the same distance as the stud 94 advances.

As shown in FIG. 2, the round boss 122 on clip 102 fits closely around the boss 98 on stud 94. The brake shoe web is thus accurately positioned and centered in coaxial relation with the stud 94, to assure proper operation of the brake.

The operation of the automatic adjustment will now be described. When the plungers 32, 34 are displaced outwardly upon actuation of the roller and wedge mechanism as described earlier, the teeth of the pawl 80 ride up on the spiral external teeth 84 of the adjusting nut 82. The size and the spiral angle of the teeth 84 are selected so that the pawl 80 will only ride up on the teeth but will not disengage from the teeth under normal braking operation, that is, these values are proportional to the predetermined clearance between the brake shoe lining and the brake drum. However, when the lining is worn the plunger assembly 32 must travel a greater distance outwardly causing the teeth of the pawl 80 to ride over the top of the teeth in which they have been engaged and fall into the next group of teeth. Upon return movement of the plunger 32 inwardly, the pawl 80 which now is fully engaged with the spiral teeth causes the adjusting nut 82 to turn, thereby advancing the stud 94 outwardly due to its threaded connection therewith.

We claim:

1. In a wedge actuated brake assembly having a movable brake shoe adapted to engage a surrounding brake drum, a self-adjusting brake actuating mechanism comprising a housing having a first opening therein, a plunger assembly guided for rectilinear movement in said first opening and adapted when urged out of said first opening to force said shoe toward said drum, said plunger assembly being automatically axially expansible to accommodate wear of the lining of the brake shoe, said plunger assembly including a ratchet member having teeth formed thereon and being slidably and rotatably received in said first opening, a pawl assembly extending into a second opening formed in said housing and communicating with said first opening, said pawl assembly including a pawl member in toothed engagement with said ratchet member, spring means urging said pawl into engagement with said ratchet member and closure means sealing the end of said second opening remote from said first opening, said pawl, spring means and closure means being joined together as a subassembly removable from said second opening as a unit.

2. In a wedge actuated brake assembly according to claim 1 wherein at least a portion of said second opening is threaded and is threadedly engaged by said closure member.

3. In a wedge actuated brake assembly according to claim 1 wherein the end of said pawl member remote from said ratchet member has a counterbore formed therein and the end of said closure member proximate said pawl member has a counterbore formed therein, said spring means comprising a coil expansion spring having one of its ends received in an interference fit in one of said bores.

4. In a wedge actuated brake assembly having a movable brake shoe adapted to engage a surrounding brake drum, a self-adjusting mechanism comprising a housing having a first opening therein, a plunger assembly bearing on said shoe and guided for movement in said first opening to energize said shoe, said plunger assembly including a ratchet member, and pawl means cooperating with said ratchet member to limit movement of said ratchet member, said pawl means being located in part in a second opening formed in said housing and communicating with said first opening and comprising a pawl member in toothed engagement with said ratchet member, a coil spring, and a plug member threadedly engaged in said second opening and projecting in part from said second opening, said pawl member and said plug having bores formed therein, said spring being positioned between said pawl member and said plug with each end of said spring being received in one of said bores in an interference fit to permanently join said pawl member, spring and plug into a unitary assembly.

* * * * *